United States Patent
Utagawa et al.

(10) Patent No.: US 10,497,189 B2
(45) Date of Patent: Dec. 3, 2019

(54) VEHICULAR CONTROL DEVICE AND METHOD OF CONTROLLING VEHICULAR CONTROL DEVICE

(71) Applicant: HITACHI AUTOMOTIVE SYSTEMS, LTD., Hitachinaka-shi, Ibaraki (JP)

(72) Inventors: Yoshiyuki Utagawa, Isesaki (JP); Ryoji Watanabe, Isesaki (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 153 days.

(21) Appl. No.: 15/558,804

(22) PCT Filed: Feb. 19, 2016

(86) PCT No.: PCT/JP2016/054886
§ 371 (c)(1),
(2) Date: Sep. 15, 2017

(87) PCT Pub. No.: WO2016/147793
PCT Pub. Date: Sep. 22, 2016

(65) Prior Publication Data
US 2018/0075674 A1    Mar. 15, 2018

(30) Foreign Application Priority Data
Mar. 17, 2015  (JP) .................. 2015-053627

(51) Int. Cl.
*G07C 5/08* (2006.01)
*B60T 13/74* (2006.01)
(Continued)

(52) U.S. Cl.
CPC .......... *G07C 5/0825* (2013.01); *B60R 16/023* (2013.01); *B60T 7/107* (2013.01);
(Continued)

(58) Field of Classification Search
CPC ....... G07C 5/0825; B60T 13/74; B60T 8/885; B60T 7/107; B60T 8/00; B60T 2270/413;
(Continued)

(56) References Cited

U.S. PATENT DOCUMENTS

| 8,044,782 | B2* | 10/2011 | Saban | ..................... B60N 2/002 340/438 |
| 9,227,470 | B2* | 1/2016 | Terada | ................. B60C 23/0408 |
| 2001/0016790 | A1* | 8/2001 | Kubo | ....................... F02D 37/02 701/34.4 |

FOREIGN PATENT DOCUMENTS

| JP | 2007-296902 A | 11/2007 |
| JP | 4147253 B2 | 9/2008 |

(Continued)

*Primary Examiner* — Frederick M Brushaber
(74) *Attorney, Agent, or Firm* — Foley & Lardner LLP

(57) ABSTRACT

The present invention relates to a vehicular control device including a plurality of ECUs connected to each other through an in-vehicle network. The vehicular control device includes a first control device that controls an electrical component and a second control device connected to the first control device through an in-vehicle network. In a case where an operation switch of the electrical component in the first control device is fixed in an on-state and an ignition key is off, data transmission from the first control device to the second control device is stopped, or the first control device is set to a reception-only mode, and thus the second control device is prevented from operating due to a wake-up function.

14 Claims, 3 Drawing Sheets

(51) Int. Cl.
*B60T 8/88* (2006.01)
*B60T 7/10* (2006.01)
*H04L 12/24* (2006.01)
*G05D 1/00* (2006.01)
*H04L 29/08* (2006.01)
*B60T 8/00* (2006.01)
*B60R 16/023* (2006.01)

(52) U.S. Cl.
CPC ........... *B60T 8/00* (2013.01); *B60T 8/885* (2013.01); *B60T 13/74* (2013.01); *G05D 1/0055* (2013.01); *H04L 41/06* (2013.01); *H04L 67/14* (2013.01); *B60T 2270/413* (2013.01)

(58) Field of Classification Search
CPC ....... H04L 41/06; H04L 67/14; G05D 1/0055; B60R 16/023
See application file for complete search history.

(56) References Cited

FOREIGN PATENT DOCUMENTS

| | | |
|---|---|---|
| JP | 2009-296280 A | 12/2009 |
| JP | 2010-254258 A | 11/2010 |
| JP | 2012-035722 A | 2/2012 |

\* cited by examiner

VEHICULAR CONTROL DEVICE AND METHOD OF CONTROLLING VEHICULAR CONTROL DEVICE

TECHNICAL FIELD

The present invention relates to a vehicular control device including a plurality of electronic control units (ECUs) connected to each other through an in-vehicle network such as a controller area network (CAN), and a method of controlling a vehicular control device.

BACKGROUND ART

Electrical components which are controlled by an ECU mounted in a vehicle are of great variety, and are controlled in various ways. For example, Patent Document 1 discloses an electric parking brake device which is controlled by an ECU. In Patent Document 1, a parking brake interlocked with a throttle operation and a shift operation is prohibited from being automatically released while an ignition power supply is on and an engine is stopped, and thus an erroneous operation is suppressed, which leads to an improvement in safety.

REFERENCE DOCUMENT LIST

Patent Document

Patent Document 1: Japanese Patent No. 4147253

SUMMARY OF THE INVENTION

Problems to be Solved by the Invention

In recent years, more and more vehicles have been equipped with electrical components, and the number of ECUs mounted per vehicle has increased. In a vehicular control device having a large number of ECUs mounted therein, a dark current when an ignition is off increases, and thus there is a strong request for a reduction in the dark current.

However, in the above-described electric parking brake, in a case where an operation switch is fixed in an on-state (called on-state fixation), a wake-up signal is fixed at a high level, and thus there is a concern that an ECU for the electric parking brake cannot be set in an operation stop (sleep) state.

For this reason, even when the ignition is off, CAN communication between the ECU and ECUs for other electrical components is performed, and the ECUs for other electrical components having a CAN wake-up function keep operating to thereby increase consumption current. In a case where the on-state fixation of the operation switch lasts for a long time, a battery is exhausted.

Such a problem does not occur only in the electric parking brake, but also occurs in a case where the operation switch of an electrical component is fixed in an on-state, in a vehicular control device including a plurality of ECUs connected to each other through an in-vehicle network.

The present invention is contrived in view of such circumstances, and an object thereof is to provide a vehicular control device capable of reducing a dark current when an ignition is off in a case where the operation switch of an electrical component is fixed in an on-state, and a method of controlling a vehicular control device.

Means for Solving the Problems

According to the present invention, there is provided a vehicular control device comprising: a first control device that controls an electrical component; and a second control device connected to the first control device through an in-vehicle network, wherein in a case where an operation switch of the electrical component in the first control device is fixed in an on-state and an ignition key is off, data transmission from the first control device to the second control device is stopped, or the first control device is set to a reception-only mode.

In addition, according to the present invention, there is provided a method of controlling a vehicular control device including a first control device that controls an electrical component and a second control device connected to the first control device through an in-vehicle network, the method comprising: diagnosing whether an operation switch of the electrical component in the first control device is fixed in an on-state; performing an on/off determination of an ignition key when the operation switch is diagnosed to be fixed in an on-state; and stopping data transmission from the first control device to the second control device or setting the first control device to a reception-only mode, in a case where the ignition key is determined to be off.

Effects of the Invention

According to the present invention, in a case where the operation switch of the electrical component is fixed in an on-state, data transmission from the first control device to the second control device is stopped, or the first control device is set to a reception-only mode, and thus it is possible to prevent the second control device from continuing an operation due to a wake-up function. Therefore, the second control device can be set to a sleep state to thereby reduce a dark current when the ignition is off.

MODE FOR CARRYING OUT THE INVENTION

Hereinafter, an embodiment of the present invention will be described with reference to the accompanying drawings.

Figure 1:
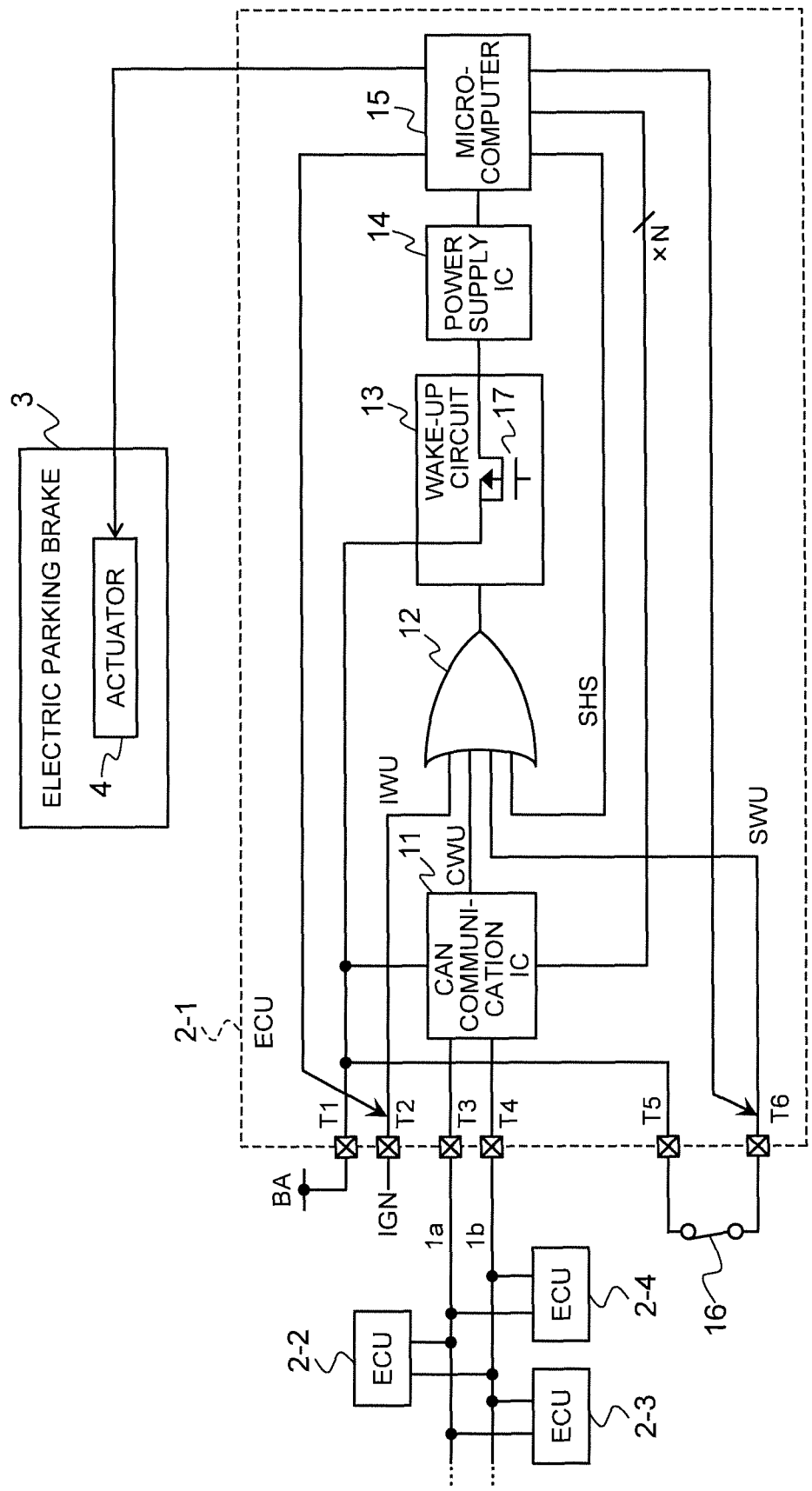
FIG. 1 is a schematic configuration diagram of a vehicular control device according to an embodiment of the present invention.

FIG. 1 is a schematic configuration diagram of a vehicular control device. FIG. 1 illustrates an electric parking brake as an example of an electrical component to be controlled. In FIG. 1, an ECU that controls the electric parking brake and the peripheral portion thereof are extracted. This vehicular control device includes a plurality of ECUs (control devices) 2-1, 2-2, 2-3, 2-4, . . . connected to each other through CAN buses 1*a* and 1*b* for an in-vehicle network. ECU 2-1 is used for an electric parking brake 3, and controls the driving of an actuator 4 that applies/releases electric parking brake 3. ECU 2-1 includes a CAN communication integrated circuit (IC) 11, an OR gate 12, a wake-up circuit 13, a power supply IC 14, a microcomputer 15, an operation switch (external switch) 16 of electric parking brake 3, and the like. ECU 2-1 is provided with a power supply terminal T1, an IGN terminal T2, CAN-H and CAN-L terminals T3 and T4, switch terminals T5 and T6, and the like. Power supply terminal T1 is supplied with power from a battery BA. A signal IGN indicating the state of an ignition key (ignition switch) is input to IGN terminal T2. CAN-H and CAN-L terminals T3 and T4 are connected to CAN buses 1*a* and 1*b*, respectively. Operation switch 16 is connected between switch terminals T5 and T6.

CAN communication IC 11 is supplied with power from power supply terminal T1, and data communication based on a CAN protocol is performed from CAN-H and CAN-L terminals T3 and T4 through CAN buses 1*a* and 1*b* by control of microcomputer 15. Microcomputer 15 controls reception, transmission, state setting or the like based on CAN communication IC 11. A CAN wake-up signal CWU is output from CAN communication IC 11 to OR gate 12. Examples of signals which are input to OR gate 12 include a signal IWU indicating the state of the ignition key from IGN terminal T2, a wake-up signal SWU corresponding to the state of operation switch 16 from operation switch 16, a self-maintenance signal SHS from microcomputer 15, and the like.

Wake-up circuit 13 wakes up microcomputer 15 in a sleep state on the basis of a logical product signal which is output from OR gate 12. Wake-up circuit 13 is configured to supply power from power supply terminal T1 to power supply IC 14 through the current passage of a semiconductor switch element which is controlled on/off on the basis of the output signal of OR gate 12, for example, a P-channel type MOS-FET 17. Microcomputer 15 monitors signal IGN indicating the state of the ignition key which is input from IGN terminal T2, and monitors wake-up signal SWU which is input from switch terminal T6. Operation switch 16 is connected between power supply terminal T1 and one input terminal of OR gate 12, and OR gate 12 is supplied with wake-up signal SWU of a high level when the operation switch enters an on-state. Here, operation switch 16 is connected to power supply terminal T1 of ECU 2-1, but may be connected directly to a power supply line on the vehicle side.

When wake-up signal SWU of a high level is input to OR gate 12, microcomputer 15 operates by power supplied from wake-up circuit 13 through power supply IC 14. Microcomputer 15 monitors the state of operation switch 16, and in a case where operation switch 16 gives an instruction to apply the electric parking brake, microcomputer 15 sets electric parking brake 3 to an applied state by driving actuator 4 through a drive circuit or the like (not shown). Microcomputer 15 further outputs self-maintenance signal SHS of a high level to OR gate 12 and holds the operating state of ECU 2-1.

In a case where operation switch 16 gives an instruction to release the electric parking brake in a state where electric parking brake 3 is applied and in a state where the ignition key is on, microcomputer 15 sets electric parking brake 3 to a release state by driving actuator 4 through a drive circuit or the like (not shown). Alternatively, even in a case where it is detected that an engine is started up and a shift operation or a subsequent accelerator operation is performed in a state where electric parking brake 3 is applied and in a state where the ignition key is on, electric parking brake 3 is set to a release state.

Figure 2:
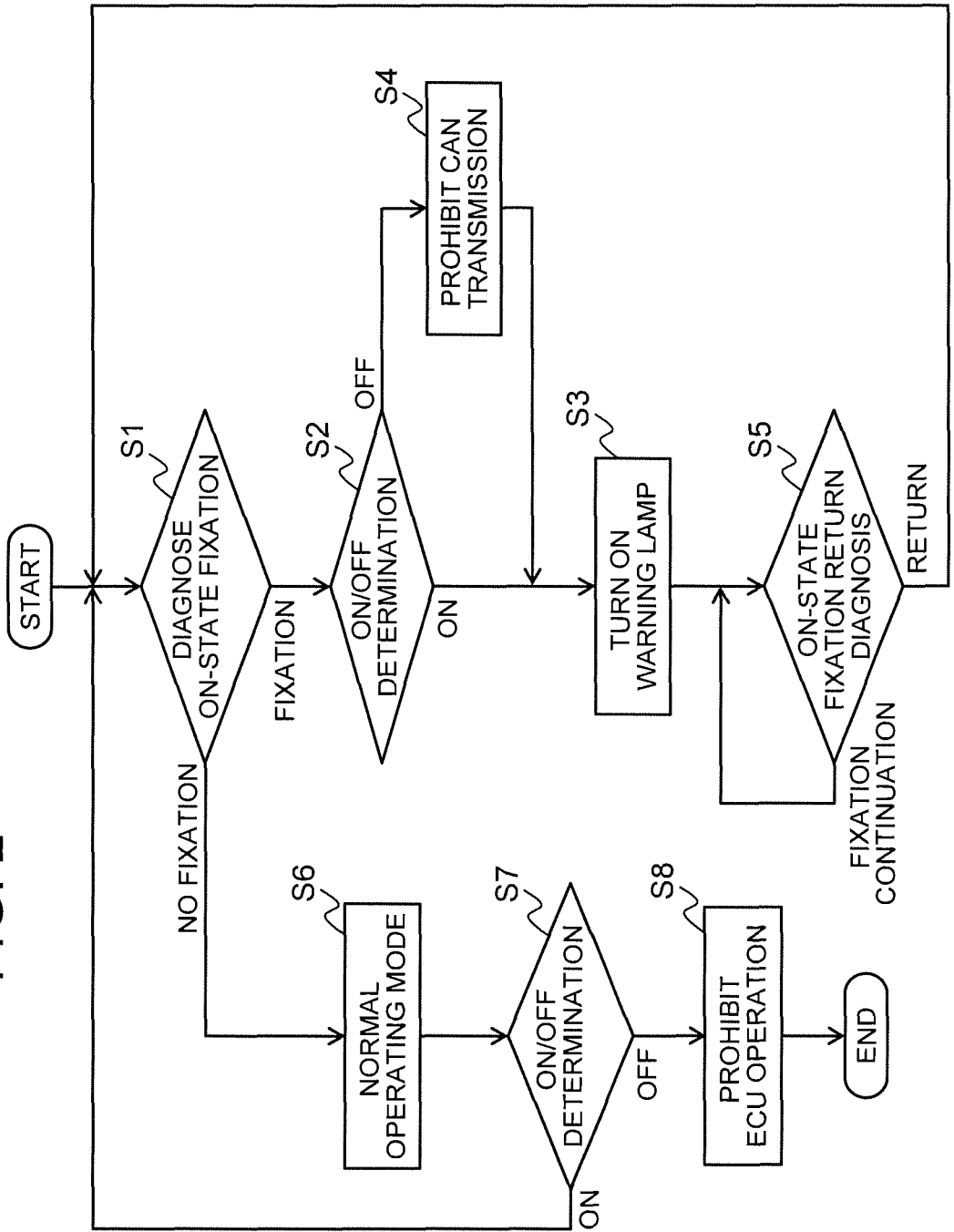
FIG. 2 is a flow diagram illustrating a first control method in a case where an operation switch of an electric parking brake is fixed in an on-state in the vehicular control device illustrated in FIG. 1.

Next, a first control method will be described with reference to the flow diagram of FIG. 2. First, microcomputer 15 diagnoses the presence or absence of on-state fixation of operation switch 16 of electric parking brake 3 (step S1). In the diagnosis of on-state fixation of operation switch 16, microcomputer 15 monitors wake-up signal (wake-up signal of ECU 2-1 that controls electric parking brake 3) SWU of switch terminal T6, and diagnoses the operation switch as on-state fixation when wake-up signal SWU is kept at a high level for a predetermined length of time. In a case where it is diagnosed that the operation switch is fixed in an on-state, the on/off determination of the ignition key is performed (step S2). The on/off determination of the ignition key is performed by microcomputer 15 monitoring signal IGN which is input from IGN terminal T2.

In a case where the ignition key is determined to be on, for example, a warning lamp is turned on in order to draw a driver's attention by notifying the driver of the determination result (step S3). On the other hand, in a case where the ignition key is determined to be off, that is, in a case where operation switch 16 of electric parking brake 3 in ECU 2-1 is fixed in an on-state, and the ignition key is off, data transmission (CAN transmission) from ECU 2-1 to ECUs 2-2, 2-3, 2-4, . . . is stopped (step S4), or ECU 2-1 is set to a reception-only mode.

Thereby, an ECU having a CAN wake-up function among ECUs 2-2, 2-3, 2-4, . . . is prevented from being woken up by the on-state fixation of operation switch 16 of electric parking brake 3, and the operations of all ECUs 2-2, 2-3, 2-4, . . . within a vehicle except ECU 2-1 are stopped. Thereafter, the process proceeds to step S3, and a warning lamp is turned on.

Subsequently, a return diagnosis of on-state fixation is performed (step S5). The return diagnosis is performed while the on-state fixation continues, and the process returns to step S1 in a case of return.

Here, in a case where the on-state fixation continues, the warning lamp is kept on, and a consumption current increases. Therefore, in a case where fixation continuously occurs a certain number of times or continues for a certain length of time when the ignition is off, the warning lamp may be turned off after failure record is kept in a storage device (not shown) within ECU 2-1.

In a case where it is determined in step S1 that on-state fixation is not present, a normal operating mode is set (step S6). In the normal operating mode, data can be transmitted and received using a CAN protocol. Next, the on/off determination of the ignition key is performed (step S7). In a case of the on determination, the process proceeds to step S1, and the above-described operation is repeated. In a case of the off determination, the operation of ECU 2-1 is stopped (slept) by microcomputer 15, and the process is terminated.

According to the configuration and the first control method as described above, in a case where operation switch 16 of electric parking brake 3 is fixed in an on-state, CAN transmission from ECU 2-1 to ECUs 2-2, 2-3, 2-4, . . . is stopped, or ECU 2-1 is set to a reception-only mode, and thus it is possible to prevent an ECU for another device having a CAN wake-up function from entering an operation continuation state. Thereby, it is possible to reduce a dark current when the ignition is off, and to prevent a battery from being exhausted due to the continuous on-state fixation of operation switch 16. Furthermore, since additional circuits and the like are not required, costs can be saved as well.

Figure 3:
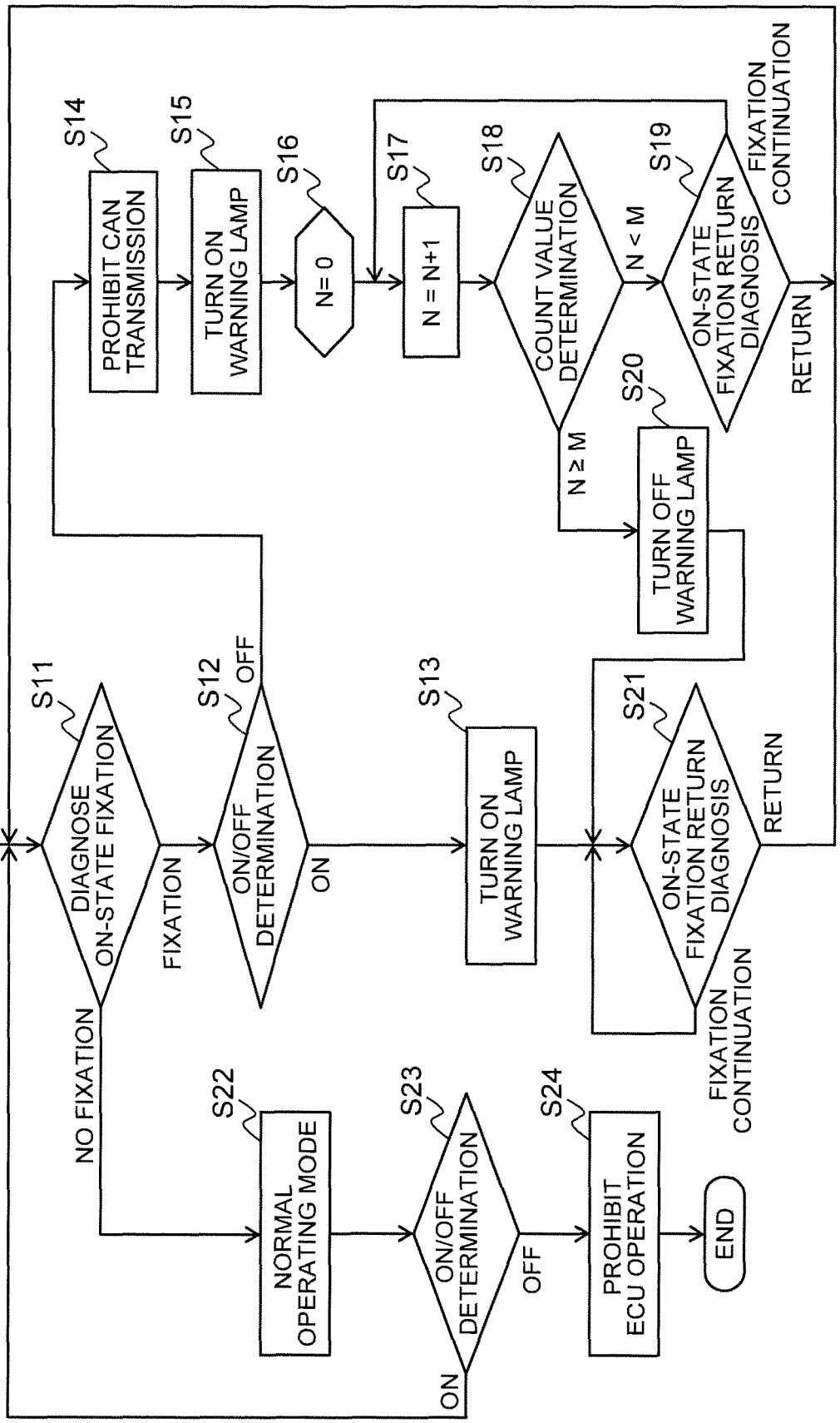
FIG. 3 is a flow diagram illustrating a second control method in a case where the operation switch of the electric parking brake is fixed in an on-state in the vehicular control device illustrated in FIG. 1.

Next, a second control method will be described with reference to the flow diagram of FIG. 3. The second control method is to provide a function of turning off the warning lamp. First, microcomputer 15 diagnoses the presence or absence of on-state fixation of operation switch 16 of electric parking brake 3 (step S11). In the diagnosis of on-state fixation of operation switch 16, microcomputer 15 monitors wake-up signal SWU of switch terminal T6, and diagnoses the operation switch as on-state fixation when a high level is continued for a predetermined length of time. In a case where the operation switch is diagnosed as on-state fixation, the on/off determination of the ignition key is performed (step S12). The on/off determination of the ignition key is performed by microcomputer 15 monitoring signal IGN which is input from IGN terminal T2.

In a case where the ignition key is determined to be on, the warning lamp is turned on (step S13). On the other hand, in a case where the ignition key is determined to be off, that is, in a case where operation switch 16 of electric parking brake 3 in ECU 2-1 is fixed in an on-state and the ignition key is off, data transmission (CAN transmission) from ECU 2-1 to ECUs 2-2, 2-3, 2-4, . . . is stopped (step S14). Alternatively, ECU 2-1 is set to a reception-only mode. Thereby, an ECU having a CAN wake-up function among ECUs 2-2, 2-3, 2-4, . . . is prevented from being woken up by the on-state fixation of operation switch 16 of electric parking brake 3, and the operations of all ECUs 2-2, 2-3, 2-4, . . . within a vehicle except ECU 2-1 is stopped. Thereafter, the warning lamp is turned on (step S15).

Next, a count value N of a counter is set to an initial value of 0 (step S16), and is counted up to "N+1" since the on-state fixation is detected (step S17). Subsequently, it is determined whether the count value N is smaller than a predetermined value M (step S18). When "N<M", the return diagnosis of the on-state fixation is performed (step S19). While the on-state fixation continues, the process returns to step S17, the count value N is counted up to "N+1", and then the determination of the count value and the return diagnosis are performed. When return is confirmed in step S19, the process returns to step S11.

In a case where it is determined in step S18 that the relation of "N≥M" is established, the warning lamp is turned off (step S20). In a case where the warning lamp is turned on in step 13, and in a case where the warning lamp is turned off in step S20, the process proceeds to step 21 and the return diagnosis of the on-state fixation is performed (step S21). The return diagnosis is performed while the on-state fixation continues, and the process returns to step S11 in a case of return.

In a case where it is determined in step S11 that on-state fixation is not present, a normal operating mode is set (step S22). In the normal operating mode, data can be transmitted and received using a CAN protocol. Next, the on/off determination of the ignition key is performed (step S23). In a case of the on determination, the process proceeds to step S11 and the above-described operation is repeated. In a case of the off determination, the operation of ECU 2-1 is stopped (slept) by microcomputer 15, and the process is terminated.

In the configuration and the second control method as described above, the warning lamp is turned off when the on-state fixation continuously occurs M times or more, in addition to the above-mentioned effect of the first control method. Therefore, the warning lamp is not kept on, whereby it is possible to further reduce a consumption current, and to further reduce the risk of battery exhaustion.

Meanwhile, in the above-described embodiment, a description has been given of the vehicular control device including an ECU that controls an electric parking brake as an example, but the present invention is not limited to the above-described embodiment, and can be carried out through modifications without departing from the scope of the invention.

That is, in the vehicular control device including a plurality of ECUs connected to each other through an in-vehicle network such as a CAN, in a case where the operation switch of an electrical component which is controlled by a specific ECU is fixed in an on-state and the ignition key is off, data transmission from the ECU to another ECU is stopped. Alternatively, the ECU is set to a reception-only mode.

Thereby, it is possible to prevent an ECU having a CAN wake-up function among a plurality of ECUs connected to a specific ECU through an in-vehicle network from being woken up due to the on-state fixation of the operation switch of an electrical component which is controlled by the ECU. As a result, it is possible to reduce a consumption current by stopping the operations of all the ECUs within a vehicle except the specific ECU, and to reduce the risk of battery exhaustion.

REFERENCE SYMBOL LIST

1*a*, 1*b* CAN bus
2-1, 2-2, 2-3, 2-4 ECU (control device)
3 Electric parking brake (electrical component)
4 Actuator
11 CAN communication IC
12 OR gate
13 Wake-up circuit
14 Power supply IC
15 Microcomputer
16 Operation switch

The invention claimed is:

1. A vehicular control device comprising:
  a first electronic control unit having a microcomputer configured to diagnose a state of an operation switch of an electrical component, monitor a signal indicating a state of an ignition key, and control the electrical component; and
  a second electronic control unit connected to the first electronic control unit through an in-vehicle network,
  wherein the microcomputer is further configured to
    stop data transmission from the first electronic control unit to the second electronic control unit or set the first electronic control unit to be in a reception-only mode, in a case where the operation switch is determined to be fixed in an on-state and the ignition key is determined to be in an off-state,
    notify a driver of the vehicle of an abnormality and perform a return diagnosis of whether the operation switch returns from a state of being fixed in the on-state, in a case where the operation switch is determined to be fixed in the on-state and the ignition key is determined to be in the on-state, and
    keep a failure record in a storage device and stop the notice to the driver, in a case where the operation switch being fixed in the on-state continuously occurs a predetermined number of times or continues for a predetermined length of time when the ignition key is off after the return diagnosis.

2. The vehicular control device according to claim 1, wherein the electrical component is an electric parking brake.

3. The vehicular control device according to claim 1, wherein the in-vehicle network is a controller area network (CAN).

4. The vehicular control device according to claim 1, wherein in a determination of fixation of the operation switch in the on-state, the microcomputer determines that fixation occurs when a wake-up signal of the first electronic control unit which is generated by turning-on of the operation switch is continuously detected for a predetermined length of time.

5. The vehicular control device according to claim 1, wherein the first electronic control unit has a wake-up function, and the second electronic control unit includes at least one electronic control unit having a wake-up function.

6. The vehicular control device according to claim 1, wherein the first electronic control unit further includes a CAN communication integrated circuit (IC), an OR gate, a wake-up circuit, and a power supply IC.

7. The vehicular control device according to claim 6, wherein the CAN communication IC is configured to perform data communication with the second electronic control unit through a CAN bus.

8. The vehicular control device according to claim 6, wherein the OR gate is configured to
receive a CAN wake-up signal output from the CAN communication IC, a signal indicating the state of the ignition key, a wake-up signal corresponding to the state of the operation switch, and a self-maintenance signal from the microcomputer, and
control the wake-up circuit.

9. The vehicular control device according to claim 6, wherein the wake-up circuit is configured to wake-up the first electronic control unit from a sleep state by supplying power from the power supply IC to the microcomputer, on the basis of an output signal of the OR gate.

10. The vehicular control device according to claim 9, wherein the wake-up circuit includes a semiconductor switch element of which a current passage is connected between a power supply terminal and the power supply IC, and the semiconductor switch element is configured to be controlled on/off on the basis of the output signal of the OR gate.

11. The vehicular control device according to claim 9, wherein the electrical component is an electric parking brake, and
the microcomputer is configured to set the electric parking brake to an applied state in a case where the operation switch gives an instruction to apply the electric parking brake.

12. The vehicular control device according to claim 11, wherein the microcomputer is configured to set the applied state of the electric parking brake by controlling a driving of an actuator that applies and releases the electric parking brake.

13. A method of controlling a vehicular control device including a first electronic control unit that controls an electrical component and a second electronic control unit connected to the first electronic control unit through an in-vehicle network, the method comprising:
diagnosing whether an operation switch of the electrical component in the first electronic control unit is fixed in an on-state;
performing an on/off determination of an ignition key when the operation switch is diagnosed to be fixed in the on-state;
stopping data transmission from the first electronic control unit to the second electronic control unit or setting the first electronic control unit to a reception-only mode, in a case where the ignition key is determined to be off;
giving a notice to a driver of a vehicle in a case where the ignition key is determined to be on;
performing a return diagnosis of whether the operation switch returns from a state of being fixed in the on-state, after the giving the notice to the driver of the vehicle; and
keeping a failure record and stopping the notice to the driver, in a case where the operation switch being fixed in the on-state continuously occurs a predetermined number of times or continues for a predetermined length of time when the ignition key is off after the return diagnosis.

14. The method of controlling a vehicular control device according to claim 13, wherein the giving the notice to the driver of the vehicle comprises turning on a warning lamp.

* * * * *